United States Patent [19]
Martin

[11] Patent Number: 5,909,213
[45] Date of Patent: *Jun. 1, 1999

[54] REMOTE HIGHLIGHTING OF OBJECTS IN CONFERENCING SYSTEM BY LOGICALLY ANDING A HIGHLIGHT BITMAP AND A FOREGROUND BITMAP

[75] Inventor: Rocco Martin, Hillsboro, Oreg.

[73] Assignee: Intel Corporation, Santa Clara, Calif.

[ * ] Notice: This patent is subject to a terminal disclaimer.

[21] Appl. No.: 08/969,364

[22] Filed: Nov. 28, 1997

Related U.S. Application Data

[63] Continuation of application No. 08/603,504, Feb. 20, 1996, Pat. No. 5,790,818, which is a continuation of application No. 08/175,732, Dec. 30, 1993, abandoned.

[51] Int. Cl.$^6$ ..................................................... G06F 15/00
[52] U.S. Cl. ............................................. 345/330; 345/349
[58] Field of Search .................................... 345/329–332, 345/349

[56] References Cited

U.S. PATENT DOCUMENTS

| | | | |
|---|---|---|---|
| 5,107,443 | 4/1992 | Smith et al. | 345/331 |
| 5,392,400 | 2/1995 | Berkowitz et al. | 395/200.33 |
| 5,515,491 | 5/1996 | Bates et al. | 345/331 |

OTHER PUBLICATIONS

VIS–A–VIS for Macintosh Version 2.1, Future Labs, Inc., pp. 3 and 10–15, Jun. 1993.

Gibson, "Briefly noted", PC Week, vol. 10, No. 46, p. 3, Nov. 22, 1993.

Machrone, "Desktop videoconferencing: seeing is almost believing", PC Magazine, vol. 13, No. 11, p. 233(9), Jun. 14, 1994.

Tucker, "GTE Vantage Solutions wins; Teleconnect's first annual desktop videoconferencing shootout", Teleconnnect, vol. 11, No. 9, p. 57(10), Sep. 1993.

Korostoff, "Workstation monitor . . .", Communications Week, No. 501, Apr. 18, 1994.

Hill et al., "The Rendezvous Language and architecture", Comm. of the ACM, vol. 36, No. 1, pp. 62(6), Jan. 1993.

Polilli, "Vendors explore interoperability for whiteboards", InfoWorld, vol. 15, No. 49, p. 1(2), Dec. 6, 1993.

(List continued on next page.)

*Primary Examiner*—Joseph R. Burwell
*Attorney, Agent, or Firm*—Blakely, Sokoloff, Taylor & Zafman LLP

[57] ABSTRACT

An apparatus and method for highlighting information between conference participants in a computer conferencing system is disclosed. In a computer conferencing system including a first participant coupled to a second participant via a communication medium, the first participant having a first display, a first cursor control device, and a first signal generation device, the second participant having a second display, a second cursor control device, and a second signal generation device, a process and apparatus is disclosed for highlighting information on a remote display. This process comprises the steps of: 1) selecting a highlighting tool using the first cursor control device and the first signal generation device, the highlighting tool being a computer implemented function represented by an icon; 2) displaying the icon representing the highlighting tool only on the first display and only while the tool is selected; 3) activating the highlighting tool using the first cursor control device and the first signal generation device; and 4) displaying a highlight image on both the first display, the colored highlight image being displayed by generating a highlight bitmap and a foreground image bitmap and logically ANDing together the highlight bitmap and the foreground image bitmap and the second display, the highlight image being displayed on the second display in a position corresponding to a position of the cursor on the first display.

18 Claims, 11 Drawing Sheets

OTHER PUBLICATIONS

Ishii et al., "ClearBoard: A Seamless Medium for Shared Drawing and Conversation with Eye Contact", Proc. of CHI '92, pp. 525–532, May 3, 1992.

Tang et al., "VideoDraw: A Video Interface for Collaborative Drawing", Proc. of CHI '90, pp. 313–320, Apr. 1990.

Tang et al., "Video Whiteboard: Video Shadows to Support Remote Collaboration", Proc. of CHI '91, pp. 315–322, Apr. 1991.

Bly et al., "Commune: A Shared Drawing Surface", Proc. of Conf. on Office Information Systems, pp. 184–192, Jan. 1990.

Robinson et al., "A Multimedia Interactive Conferencing Application for Personal Workstations", IEEE Transactions on Communications, vol. 39, No. 11, pp. 1698–1708, Nov. 1991.

Minneman et al., "Managing a trois: a study of a multi–user drawing tool in distributed design work", Proc. of CHI '91, pp. 217–224, Apr. 1991.

IBM Person to Person/2: Installing and Using Guide, IBM Corp., pp. 1–1 to 1–5, 7–1 to 7–15, Jan. 1992.

ShareView & ShareView Plus Reference Manual, ShareVision Technology Inc., pp. 1, 38–41, Mar. 1993.

Whiteboard User'Manual, Group Logic, Inc., pp. vii–1, 58–75, Feb. 1993.

5,909,213

REMOTE HIGHLIGHTING OF OBJECTS IN CONFERENCING SYSTEM BY LOGICALLY ANDING A HIGHLIGHT BITMAP AND A FOREGROUND BITMAP

This is a continuation of application Ser. No. 08/603,504 filed Feb. 20, 1996, now U.S. Pat. No. 5,790,818, was a file wrapper continuation of application Ser. No. 08/175,732 filed on Dec. 30, 1993, abandoned.

BACKGROUND OF THE INVENTION

1. Field of the Invention

The present invention relates to the field of networked computer systems. Specifically, the present invention relates to the field of highlighting objects displayed across a networked computer system.

2. Description of Related Art

A set of personal computers interconnected on a network can be effectively used as a conferencing system. In such a system, each conference participant comprises a personal computer user having a computer, a display screen, a computer network interface, and typically a mouse or cursor movement device. Conference participants are linked together over a computer network or other data communications medium. This network may comprise either a hard wired local area network (LAN) such as Ethernet, a telephone modem link, or other conventional data communications network. Because the conference participants are linked via a computer network, the participants do not need to be located in the same physical space. Rather, an effective conference may be carried out as participants view common information over their display screens and manipulate the information using their cursor devices or other input devices.

Several problems with these conferencing systems exist in the prior art. Conventional conference participants typically have a cursor movement device, such as a mouse or trackball device, connected to their system. This cursor movement device provides a means for moving a visible cursor symbol around on the user's computer display screen. In this manner, a user may manipulate a local cursor symbol. It is also advantageous for a conference participant to manipulate displayed symbols or annotations on the display screen of other conference participants. It would be advantageous for a first conference participant to manipulate a remote symbol on the display screen of a second conference participant using the cursor movement device of the first conference participant's computer system. The manipulation of a remote symbol is particularly useful for highlighting portions of a remote conference participant's display screen. For example, it would be advantageous to highlight portions of text on a remote screen using a local cursor movement device. Prior art systems cannot effectively provide this highlighting capability in a conferencing system. Further, prior art methods of combining symbols or displayed images typically causes an undesired effect on the color of the combined image. The prior art method of combining images using an exclusive OR process produces this undesired effect.

Thus, a better means for highlighting information between conference participants in a computer conferencing system is needed.

SUMMARY OF THE INVENTION

The present invention provides a computer readable medium that stores a computer program for highlighting information on a remote display in a computer conferencing system. The computer conferencing system includes a first participant has a local display and a local input device for controlling a local cursor. The second participant has a remote display. The computer program includes instructions that perform the following. A highlighting tool using the local input device is selected. The highlighting tool is a computer implemented function represented by an icon. The icon representing the highlighting tool on the local display is displayed. The highlighting tool, using the local input device, is activated. A highlight image corresponding to the selected highlighting tool is displayed on both the local display and the remote display upon the activation of the highlighting tool. The highlight image is displayed on the remote display in a position corresponding to a position of the local cursor on the local display. The step of displaying a highlight image includes the steps of: generating a highlight bit map; generating a foreground image bit map; and logically ANDing together the highlight bit map and the foreground image bit map.

DETAILED DESCRIPTION OF THE PREFERRED EMBODIMENT

The present invention is an apparatus and method for highlighting information between conference participants in a conferencing system. In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to obscure unnecessarily the present invention.

Figure 1:
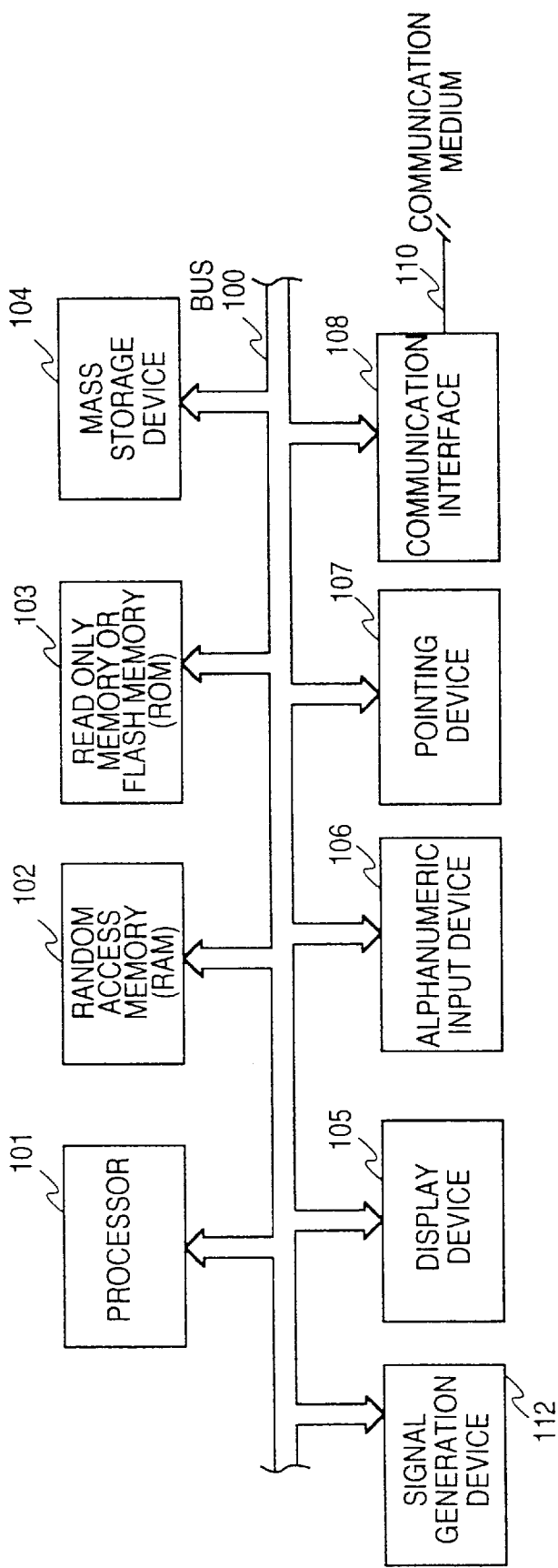
FIG. 1 is a block diagram illustrating the computer system hardware used in the preferred embodiment of the present invention.

Referring now to FIG. 1, a block diagram of the computer system hardware used in the preferred embodiment is illustrated. The computer system used in the preferred embodiment comprises a Bus 100 for communicating information between computer system components. These components coupled to Bus 100 include Processor 101. In the preferred embodiment, Processor 101 is an i486 or Pentium brand microprocessor manufactured by Intel Corporation, Santa Clara, Calif. Pentium and i486 are trademarks of Intel Corporation. Other system components include Random Access Memory (RAM) 102, Read Only Memory (ROM) 103, and mass storage device or disk drive 104. The computer system of the preferred embodiment also includes display device 105 coupled to the Bus 100 for displaying information to a computer user, an alphanumeric input device 106 coupled to the Bus 100 for communicating information and command selections to the Processor 101, a pointing device or cursor control device 107 coupled to the Bus 100 for communicating information and command selections to Processor 101, and a signal generation device 112 coupled to the Bus 100 for communicating command selections to the Processor 101. Display device 105 may be a liquid crystal device, cathode ray tube, or other suitable display device. Alphanumeric input device 106 is typically an alphanumeric or function key keyboard. Pointing device or cursor control device 107 is typically a mouse, trackball device, joystick or stylus allowing the computer user to dynamically signal the two dimensional movement of a visible symbol (i.e. cursor) on the display screen of display device 105. Many implementations of the cursor control device 107 are well known in the art, including trackball, mouse, joystick, stylus or special keys on the alphanumeric input device 106 capable of signaling movement in a given direction. Signal generation device 112 is typically implemented as a button or switch located on or near the cursor control device 107. The physical proximity of cursor control device 107 and signal generation device 112 allows a user to manipulate both devices simultaneously with one hand. The signal generation device may be operated between two control states: an active control state typically initiated by depression of a mouse button, and an inactive control state typically initiated by releasing the mouse button.

The computer system used in the preferred embodiment also includes a communication interface 108. Communication interface 108 is coupled to communication medium 110. Communication interface 108 provides a means for the computer system to communicate with a network of other computer systems. A variety of other networks are well known in the art. These communication media 110 include well known Local Area Networks (LAN) such as Ethernet, Wide Area Networks (WAN), telephone modem links, wireless, or other well known and conventional computer networking technology. The configuration and interconnection of computer system components as illustrated in FIG. 1 is well known to those of ordinary skill in the art.

Figure 2:
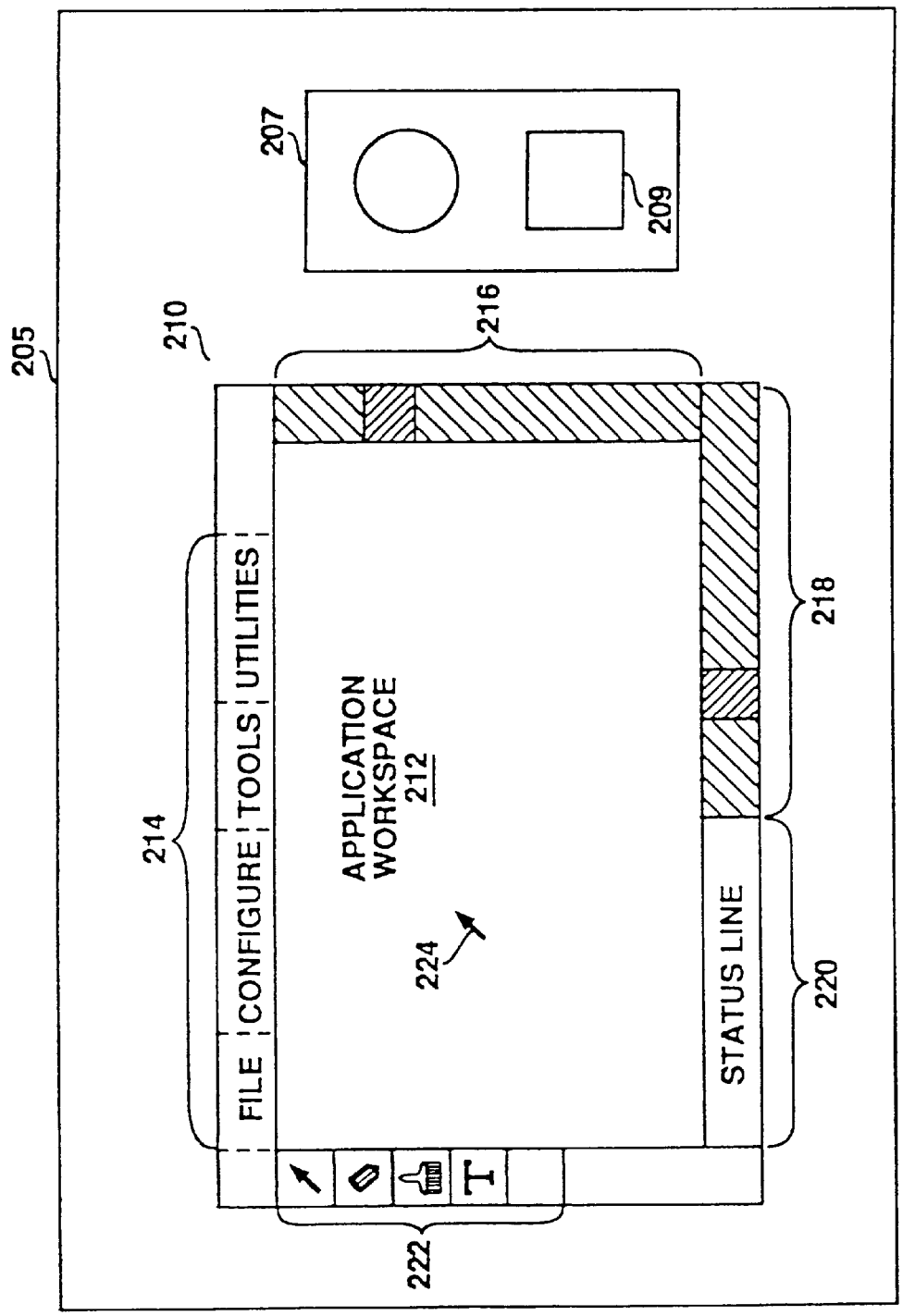
FIG. 2 illustrates a typical screen display provided in a conventional computer system.

Referring now to FIG. 2 a computer system 405 including, a screen display 210 on a conventional computer system is illustrated. In addition, a cursor control device 207 (i.e. mouse) and signal generation device 209 (mouse button) is illustrated. Conventional screen display 210 comprises a displayed set or menu of function or command selections 214 displayed across the top of the display screen. In addition, tool selections 222 are displayed along a left hand edge of the display screen. Vertical scroll bar 216 and horizontal scroll bar 218 is also provided. A status line 220 provides a display region for various system status messages. This typical screen display 210 and corresponding user interface functionality is available in the prior art from various sources including the Windows operating system developed by Microsoft Corporation of Redmond, Wash., or various operating systems and applications running on the Apple Macintosh brand computer systems manufactured by Apple Computer, Inc. of Cupertino, Calif. Microsoft is a trademark of Microsoft, Inc. Apple and Macintosh are trademarks of Apple Computer, Inc.

Screen display 210 includes an application workspace 212 in which a user may draw images or type text using one of tools 222. In addition, a cursor symbol 224 is displayed and responsive to the movement to cursor control device 207. Cursor 224 provides a means for pointing to various regions on display screen 210. Again, the use of cursor symbol 224 is well known to those of ordinary skill in the art.

Figure 3:
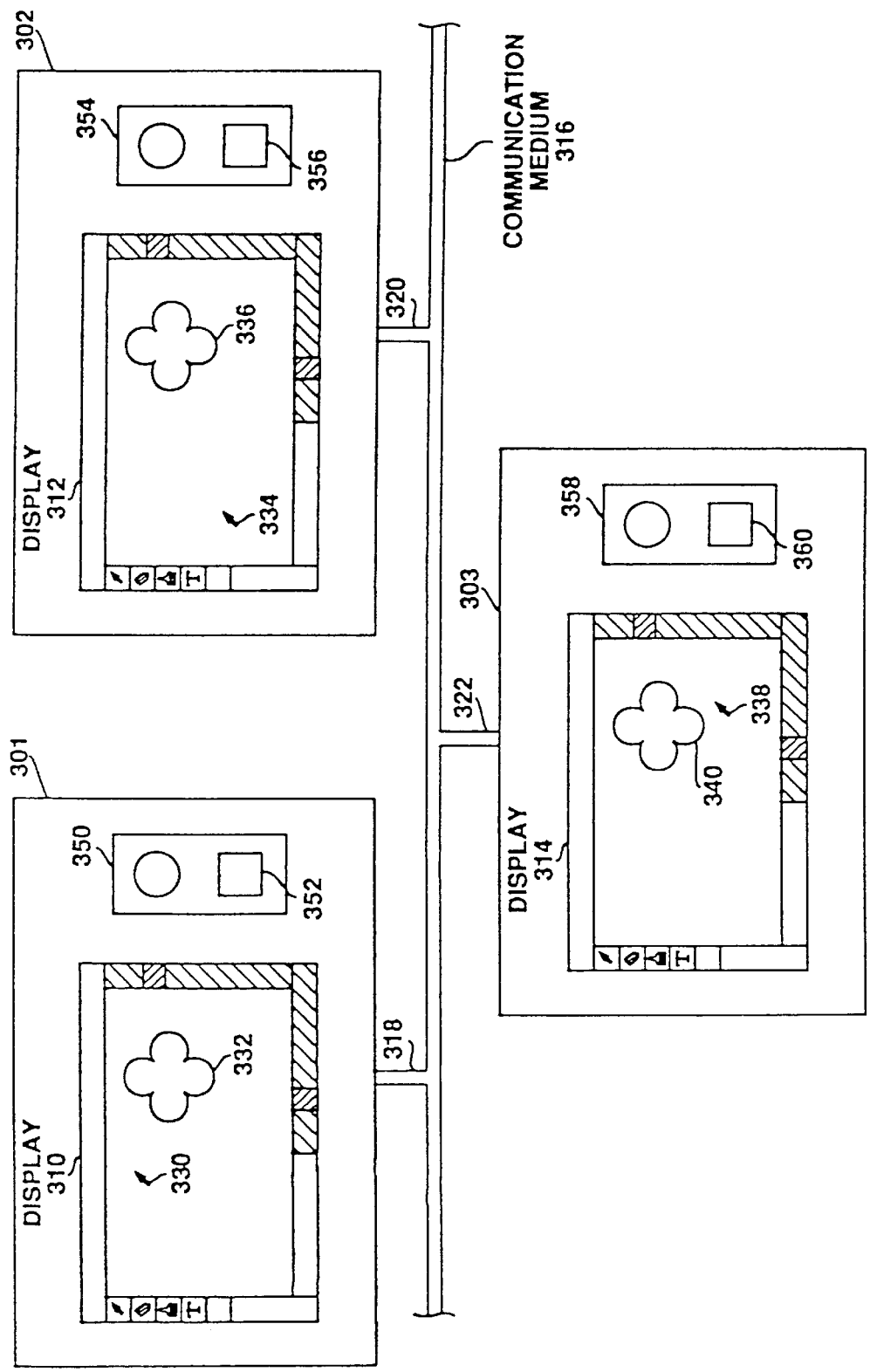
FIG. 3 illustrates a conventional computer system network having three independent computer systems interconnected on a communication medium.

Referring now to FIG. 3, a conventional computer network or conferencing system is illustrated. This sample conferencing system includes three computer systems, 301, 302 and 303, all coupled via communication medium 316. As described earlier, these computer systems, 301, 302 and 303, and the communication medium 316 over which they communicate are well known to those of ordinary skill in the art. Conventional computer system 301 includes a screen display 310, cursor control device 350, and mouse button 352. Cursor control device 350 is used to manipulate cursor symbol 330 on display 310. Because cursor 330 of display 310 is manipulated using cursor control device 350 of the same computer system 301, cursor 330 is called the local cursor of computer system 301. Any arbitrary object 332 may be displayed on display screen 310. Similarly, computer system 302 comprises display screen 312, cursor control device 354, and signal generation device 356. Local cursor 334 of display screen 312 is controlled by cursor control device 354. Computer system 303 comprises display screen 314, cursor control device 358, and signal generation device 360. Local cursor 338 of the display screen 314 is controlled via cursor control device 358.

Prior art networking systems provide means for transferring objects from one computer system to another across communication medium 316. For example, object 332 displayed on display 310 may be transferred via interface 318 across communication medium 316 to computer system 302 and/or computer system 303. In this manner, object 332 may be displayed on display 312 as object 336 and/or displayed on display 314 as object 340. Thus, information may be shared among computer systems 301, 302, and 303. Typically, cursors 330, 334, and 338 act as local cursors to the computer systems on which they are displayed.

Figure 4:
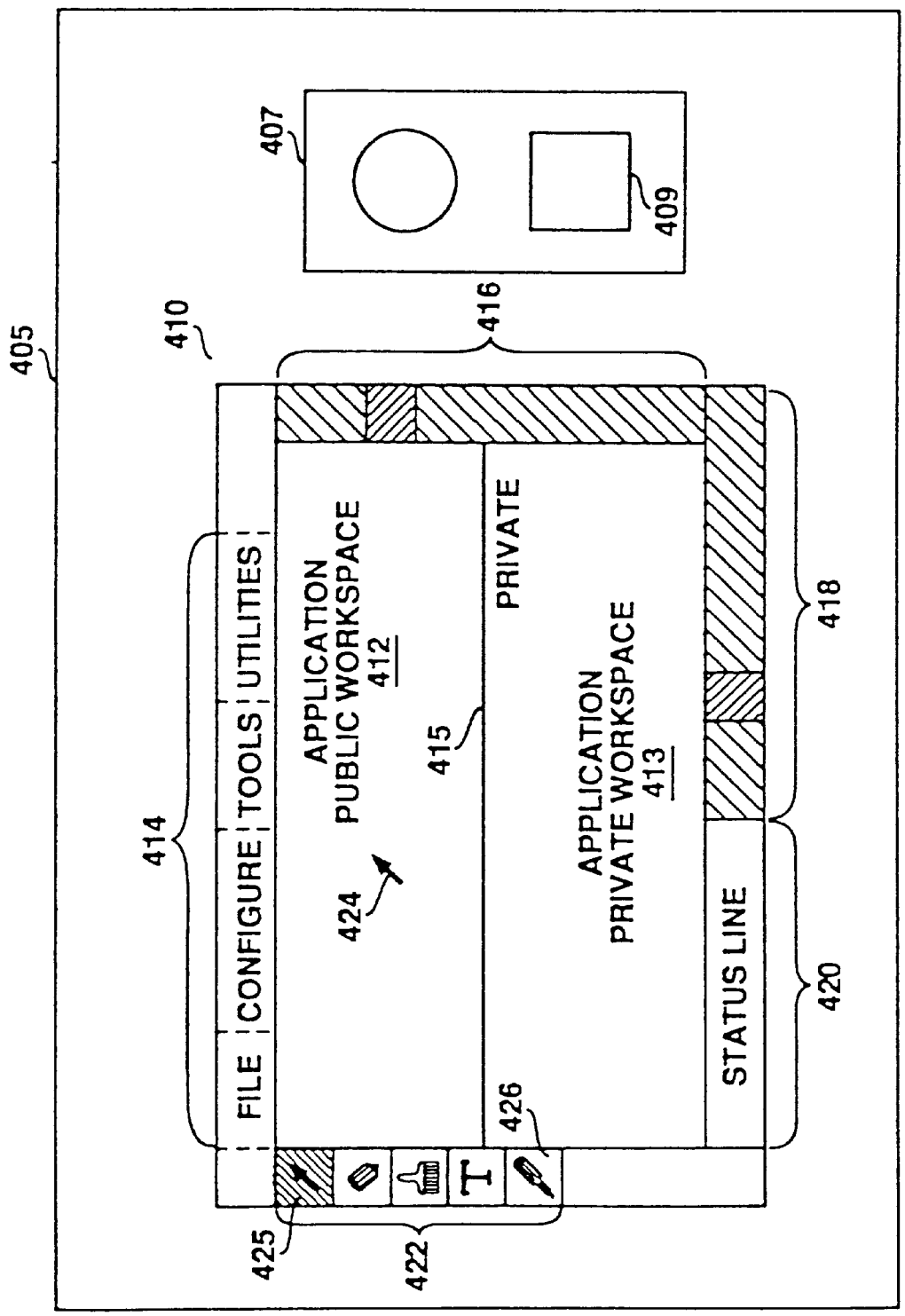
FIG. 4 illustrates the screen display provided by the preferred embodiment of the present invention. This screen display illustrates the public and private workspaces of the present invention.

Referring now to FIG. 4 a computer system 405 including, a screen display 410 provided in the preferred embodiment of the present invention is illustrated. Screen display 410 includes prior art elements such as the function or command menu 414, the tool palette 422, the vertical scroll bar 416, the horizontal scroll bar 418, and optional status line 420. The preferred embodiment also uses cursor control device 407 and signal generation device or mouse button 409. In a unique diversion from the prior art, the present invention bisects the application workspace into application public workspace 412 and application private workspace 413 separated by line 415. Application public workspace 412 defines a region of display 410 that is visible to other conference participants on a network, such as the one illustrated in FIG. 3 and FIG. 4. A user of computer system 405 can select tools from tool palette 422 and draw or type annotations or objects within application public workspace 412. Any annotations or objects drawn in this region are transmitted across the conferencing network as data messages. In this manner, annotations or objects drawn on a first conference participant display are visible to other conference participants on the network. Scroll bars 416 and 418 may be used in a conventional manner to select in two dimensions the portion of application public workspace 412 visible within display 410. The border 415 between application public workspace 412 and application private workspace 413 may be vertically moved using cursor control device 407 and signal generation device 409 in order to selectively modify the size of public workspace 412 and private workspace 413. In the preferred embodiment, local cursor 424 is positioned using cursor control device 407 over border line 415. Signal generation device 409 may then be activated to initiate movement of border 415. With signal generation device 409 activated (i.e. depressed), cursor 424 is moved vertically using cursor control device 407. As this movement occurs with signal generation device 409 activated, border 415 is moved vertically with cursor 424 until signal generation device 409 is deactivated. At this point, border 415 is left at the cursor position where signal generation device 409 was deactivated. Border 415 may be moved across the entire vertical range of the application workspace within display 410.

Application private workspace 413 comprises a region of display 410 wherein objects or annotations created are not transmitted to other conference participants. Annotations and objects created in application private workspace 413 using tools of tool palette 422 are only visible on the local display 410 of the computer system 405 on which the private annotations or objects were created. Thus, by locating cursor 424 in either the public workspace 412 or private workspace 413, a user can quickly determine if objects or annotations created will be visible to other conference participants.

Referring still to FIG. 4, a standard cursor tool 425 of tool palette 422 has been selected. The corresponding cursor 424 is displayed on display screen 410. The selection and display of this type of standard cursor is well known to those of ordinary skill in the art. As provided in the preferred embodiment of the present invention, tool palette 422 includes a highlighting tool 426. The highlighting tool 426 provides a means for remotely displaying a highlight image on the display screen of other conference participants. The characteristics and operation of highlighting tool 426 are described in detail below in connection with the remaining figures of the detailed description herein. It will be apparent to those of ordinary skill in the art that any of tools 422 may be selected and used in either application public workspace 412 or application private workspace 413.

Figure 5:
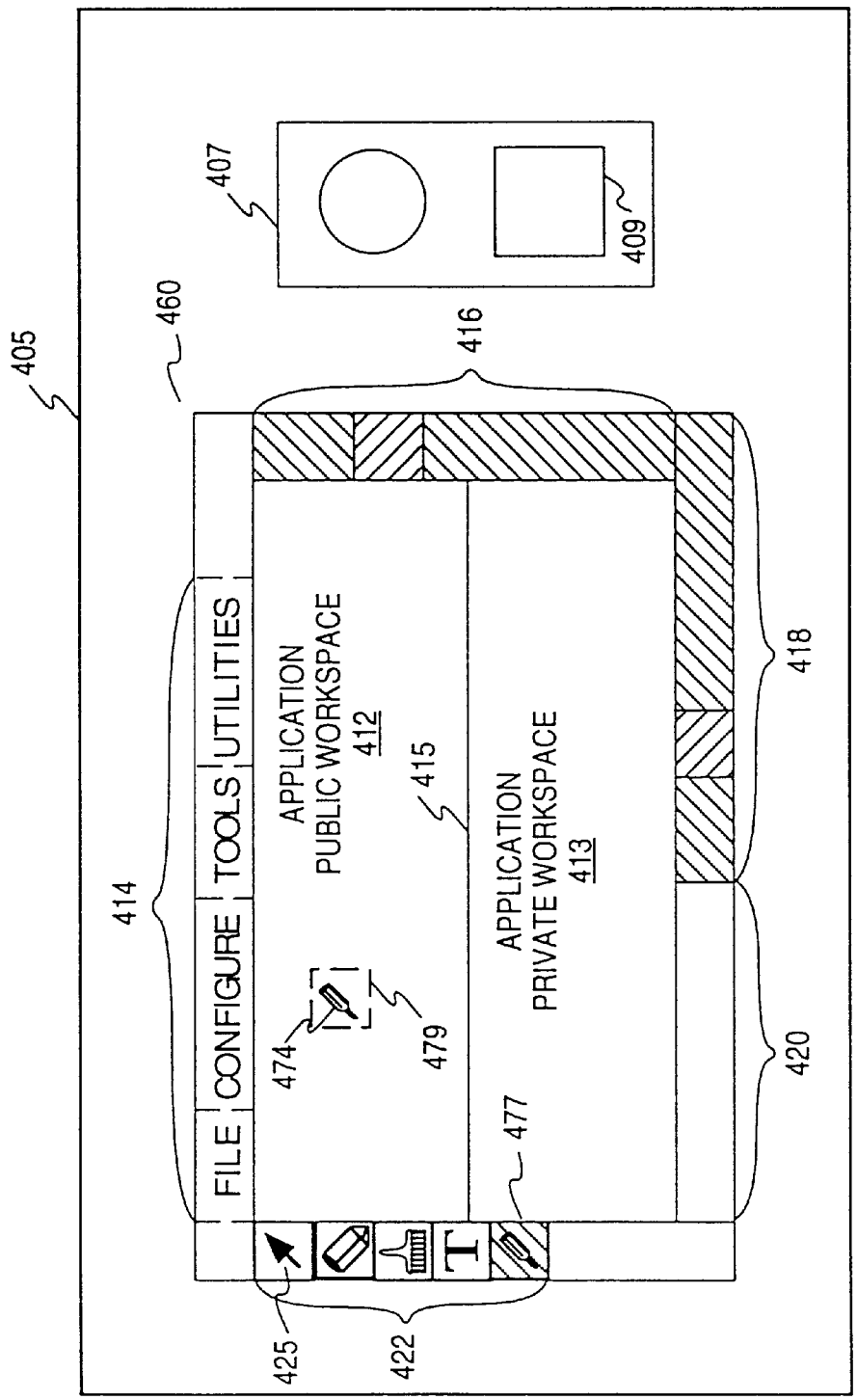
FIG. 5 illustrates a screen display with a tool selected and displayed in the public workspace.

Referring now to FIG. 5, the computer system 405 including screen display 460 is illustrated. In the example illustrated in FIG. 5, highlighting tool 477 has been selected from palette 422 using cursor control device 407 and signal generation device 409. As a result of the selection of highlight tool 477, the cursor symbol changes to a representation 474 of the selected highlight tool. Conventional techniques are well known for selecting a tool from a tool palette and changing a cursor symbol to a corresponding tool representation. In order to describe the operation of the highlight tool of the present invention, area 479 of application public workspace 412 is illustrated in more detail in FIG. 6.

Figure 6:
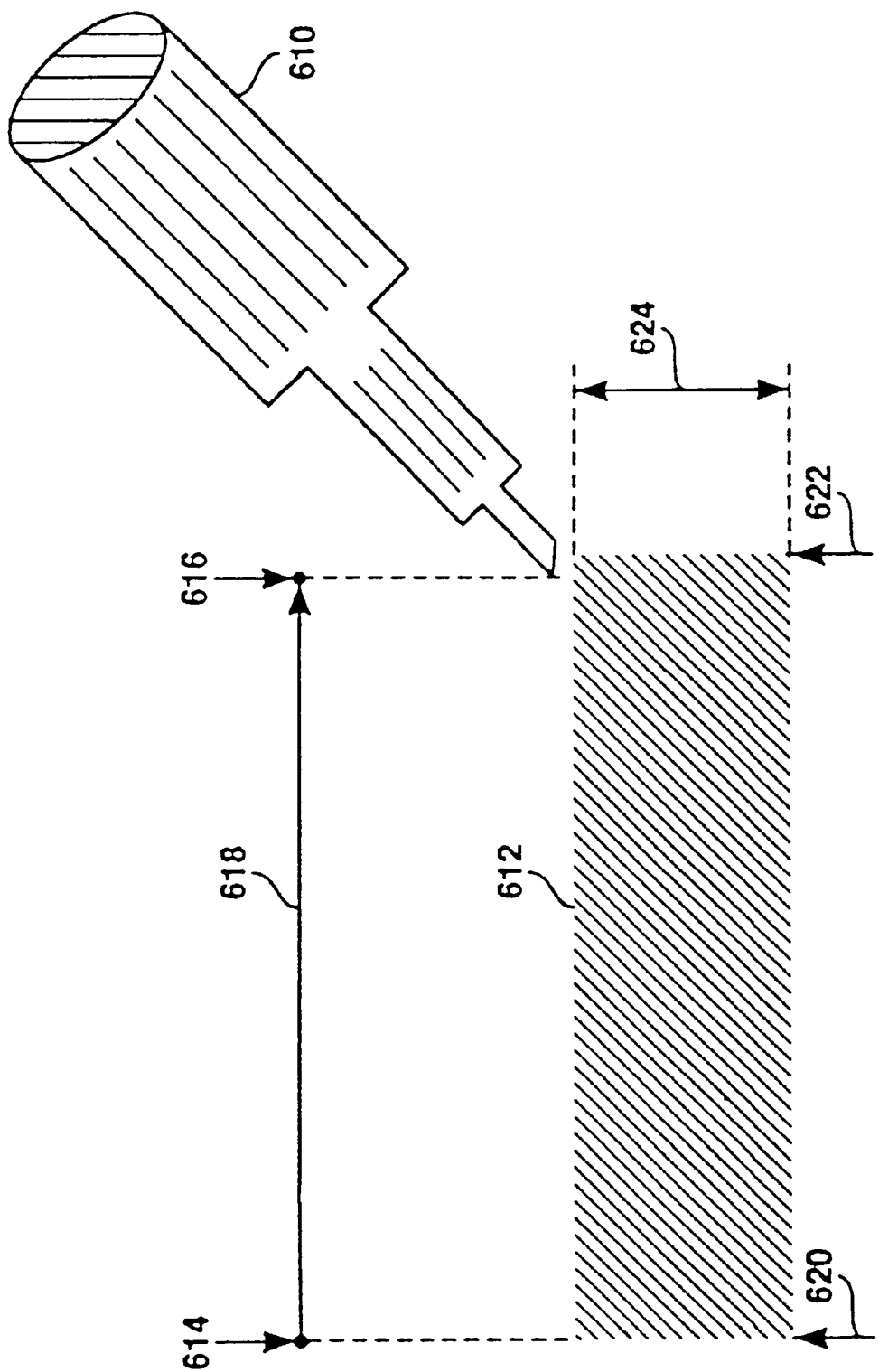
FIG. 6 illustrates the highlight tool and the highlight image it produces.
Figure 7A:
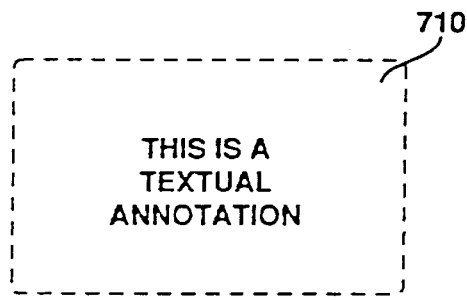
FIGS. 7A, 7B, and 7C illustrate a highlight image, a foreground image, and a highlighted foreground image.
Figure 7B:
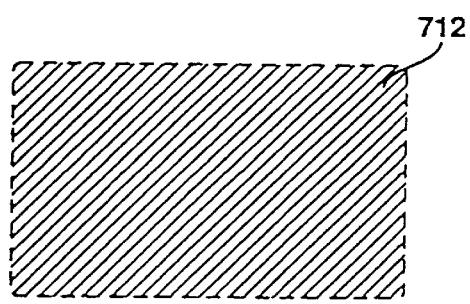
Figure 7C:

Referring now to FIG. 6, highlight tool representation 610 is illustrated. Highlight tool representation 610 is displayed in place of the normal cursor symbol when the highlight tool is selected. Representation 610 moves on the display screen in a manner corresponding to the manipulation of cursor control device 457. By way of example, point 614 illustrated in FIG. 6 corresponds to an initial cursor position when signal generation device 459 is activated. After highlight tool 477 has been selected and signal generation device 459 has been activated at an initial cursor position 614, a highlight image 612 is enabled for display starting at initial cursor position 614 and extending to a current cursor position 616 as representation 610 moves in a manner corresponding to the movement of cursor control device 457. Line 618 represents a movement of cursor 610 from initial point 614 to current cursor position 616. As part of the present invention, a highlight image 612 is drawn between initial cursor position 614 and current cursor position 616. The highlight image 612 comprises a translucent shaded or colored image of a predetermined height 624. FIGS. 7A, 7B, and 7C illustrate the translucent nature of highlight image 612.

Figure 8A:
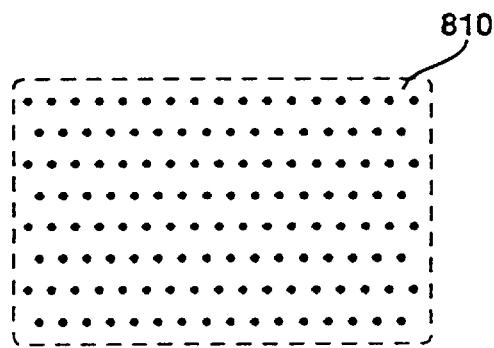
FIGS. 8A and 8B illustrate the bitmap used in the present invention.
Figure 8B:
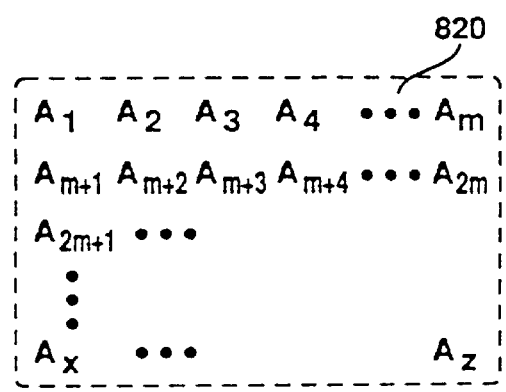

Referring now to FIG. 7A, a textual annotation 710 is illustrated. Annotation 710 is displayed in a conventional manner on a display screen of display device 105. Annotation 710 may equivalently be a graphical annotation such as annotation 332 illustrated in FIG. 3. These images may be denoted foreground images. FIG. 7B illustrates a highlighting image 712. Highlighting image 712 comprises a shaded or colored region that may be displayed on the display screen of display device 105. Using the techniques described herein, the foreground image 710 may be combined with the highlighting image 712 to produce a highlighted image such as the sample highlighted image 714 illustrated in FIG. 7C. Note that the foreground image 710 is still visible in highlighted image 714. Thus, the highlighting image 712 provides a transparent highlighting image. In this manner, a local user can direct attention to portions of the display screen for the benefit of other conference participants. Foreground image 710 and highlighting image 712 are both represented using a conventional bitmap. This bitmap comprises information for representing an image as an array of picture elements for pixels. Both black and white and color images can be displayed on a display screen using this well-known technique. One such pixel array is illustrated in FIG. 8A. Rows and columns of pixels are arranged in an orthogonal pattern and are individually eliminated to produce a composite image. The information for appropriately eliminating pixels of an image is maintained in an image bitmap such as bitmap 820 illustrated in FIG. 8B. Each pixel is represented by a data item $A_1$ to $A_Z$ each of these data items may be a number of bits corresponding to the quantity of shades of gray or quantity of colors supported in a particular system. In the preferred embodiment, each data item in bitmap 820 is represented by a 32-bit integer value. A bitmap such as bitmap 820 may be used to represent both the foreground image 710 and the highlight image 712 illustrated in FIGS. 7A and 7B, respectively. Using the technique described below and illustrated in FIGS. 9A and 9B, the foreground image bitmap can be combined with the highlight bitmap to produce a combined highlighted image bitmap.

Figure 9A:
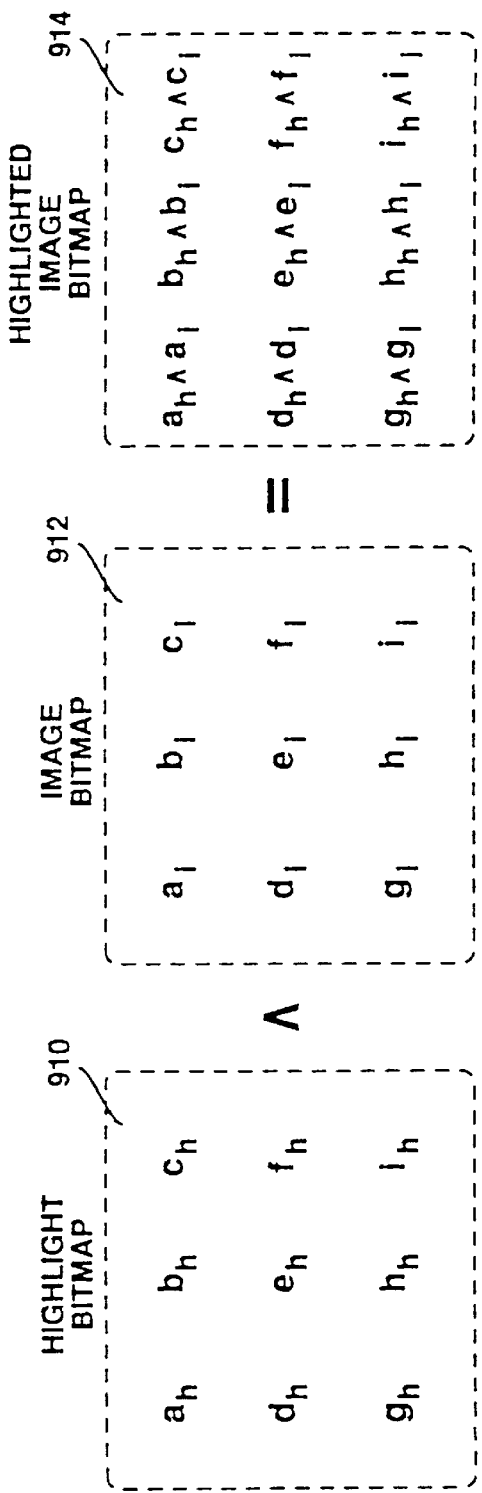
FIGS. 9A and 9B illustrate a highlight bitmap and image, a foreground bitmap and image, and a highlighted foreground bitmap and image.
Figure 9B:
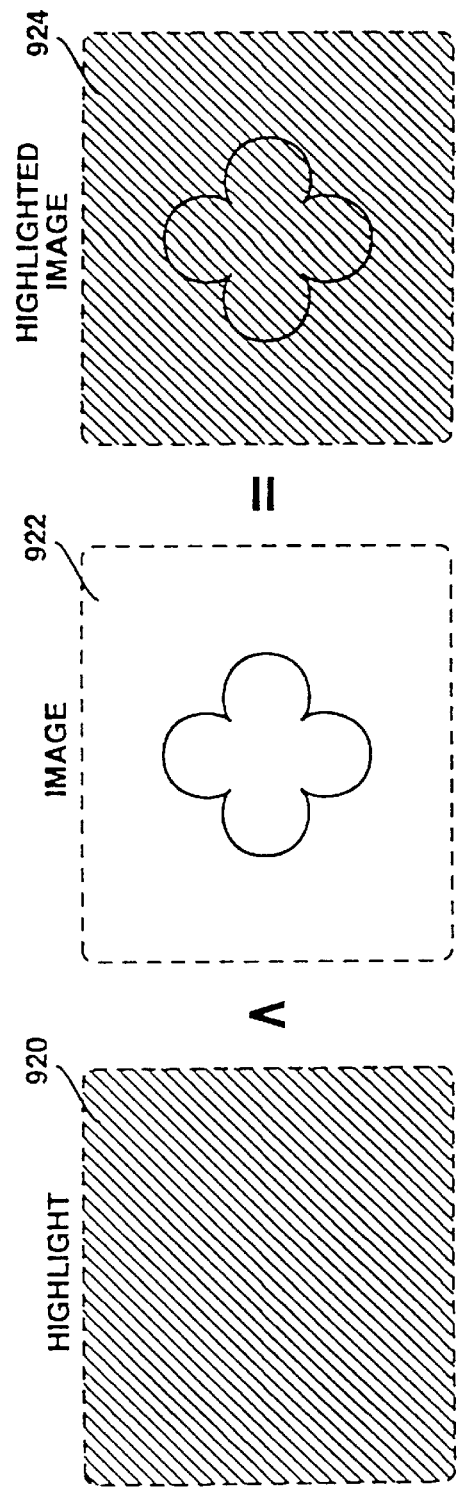

Referring now to FIGS. 9A and 9B, the technique used in the present invention for combining a highlight bitmap with an image bitmap is illustrated. Referring to FIG. 9A, highlight bitmap 910 is illustrated as comprising an array of data items $a_h$ to $i_h$ representing individual pixels of the highlight bitmap. Similarly, image bitmap 912 comprises data items $a_i$ to $i_i$ representing individual pixels of a foreground image or annotation. In the present invention, the highlight bitmap 910 is logically ANDed together to produce a highlighted image bitmap 914. Referring to FIG. 9B, highlight image 920 illustrates an image represented by highlight bitmap 910 illustrated in FIG. 9A. Similarly, foreground image 922 is an image represented by image bitmap 912 illustrated in FIG. 9A. Highlighted image 924 illustrates the visual effect produced by combining highlight image 920 with foreground image 922 using the manner described herein. By using a logical AND operation instead of a logical exclusive OR, the present invention gains the advantage of not losing any colors in the highlighted or combined image 924. The present invention also ensures that the foreground image 922 is visible in the resulting highlighted image 924.

Figure 10:
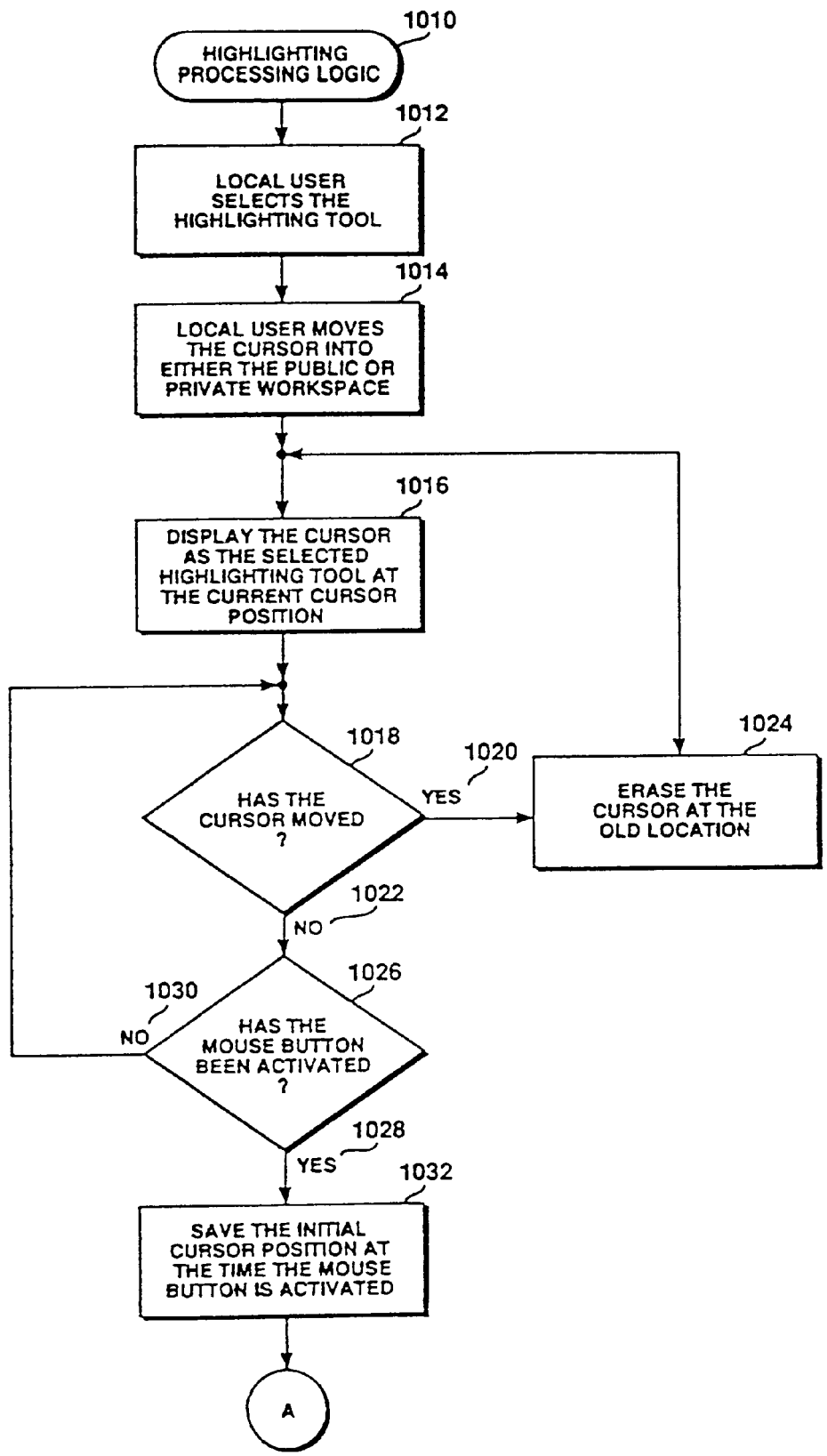
FIGS. 10 and 11 are flowcharts illustrating the processing logic of the present invention.
Figure 11:
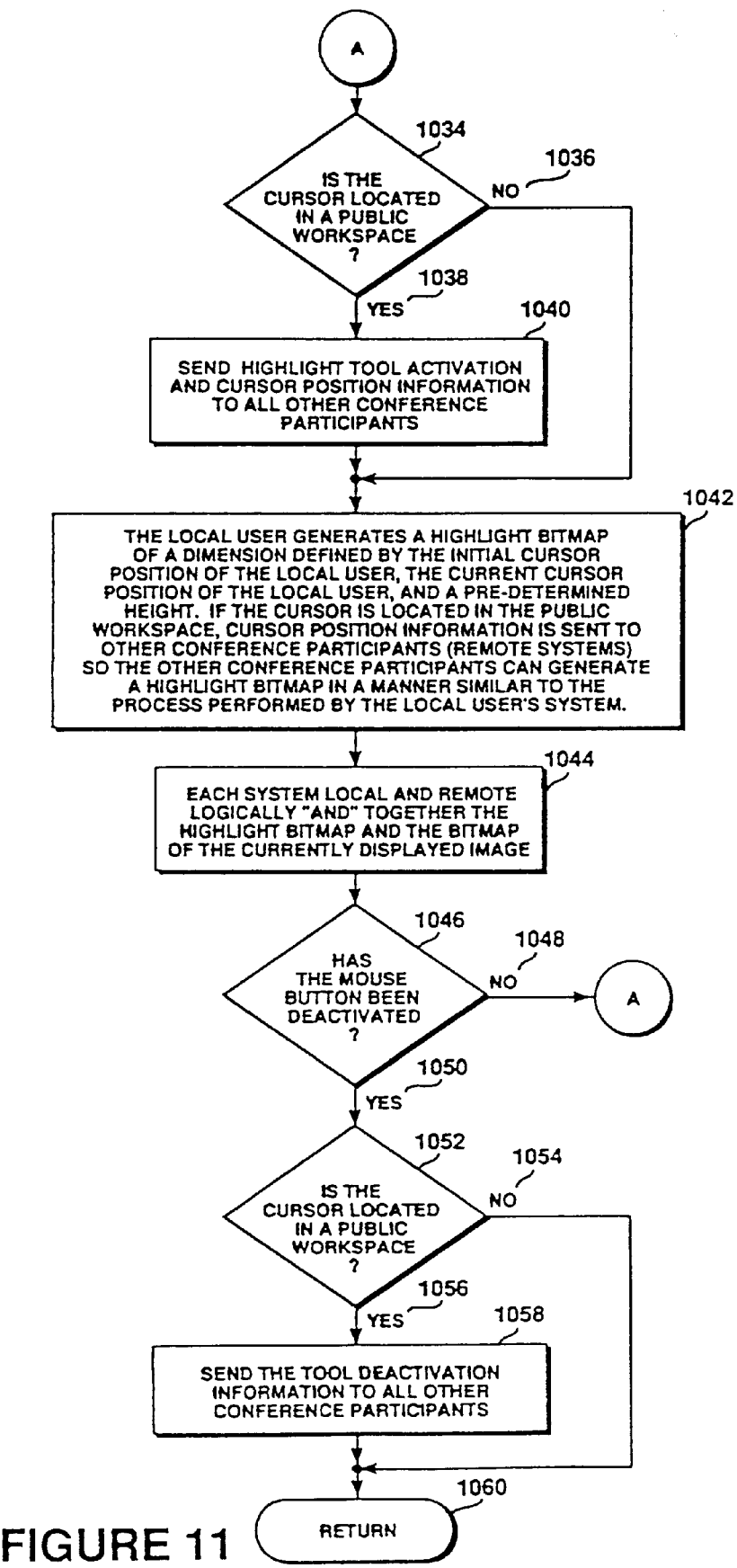

Referring now to FIGS. 10 and 11, flowcharts illustrate the processing logic of the present invention. This processing logic of the preferred embodiment is operably disposed within Random Access Memory 102 and executed by processor 101 of the computer system described in reference to FIG. 1. The processing logic of the present invention may equivalently be disposed in read only memory 103 or other memory means accessible to processor 101 for execution. This processing logic can be a separately compiled or loaded entity or incorporated as a part of a larger operating system or application software package. In either case, a means for activating the processing logic of the present invention may be employed using techniques well-known to those of ordinary skill in the art. Once activated, the processing logic of the present invention operates in the manner described below.

Referring now to FIG. 10, the highlighting processing logic of the present invention is illustrated starting at bubble 1010. In processing block 1012, a local user of a computer system selects the highlighting tool from a tool palette using techniques well-known to those of ordinary skill in the art. The local user may then move the cursor into either the public or private workspace (processing block 1014). The cursor symbol is then replaced with a representation of the highlighting tool in processing block 1016. If the cursor moves, processing path 1020 is taken to processing block 1024 where the cursor representation is erased at the old location. Processing loops back to processing block 1016 where the highlighting tool cursor representation is displayed at the new current cursor position. This process continues as long as the cursor moves and the mouse button or signal generation device is inactive. If the signal generation device or mouse button is activated (i.e., depressed), processing path 1028 is taken to processing block 1032 where the initial cursor position at the location where the signal generation device was activated is retained. Processing then continues at the bubble labeled A illustrated in FIG. 11.

Referring now to FIG. 11, the highlighting processing logic of the present invention continues at the bubble labeled A. Because the highlighting tool has been selected and the signal generation device has been activated, processing continues as decision block 1034. In this case, the current location of the cursor is tested. If the cursor is located in the public workspace, processing path 1038 is taken to processing block 1040 where the highlighting tool activation and cursor movement information is formatted into data messages which are transferred across the communication medium to all other conference participants. A result of this transfer of information, the remote conference participants display the active highlighting tool cursor representation on their local display screens. If the cursor is located in a private workspace, processing path 1036 is taken thereby avoiding the step of sending tool activation and cursor position information to other conference participants. At processing block 1042, the local user generates a highlight bitmap of the dimension defined by the initial cursor position of the local user, the current cursor position of the local user, and a predetermined height. If the cursor is located in the public workspace, cursor position information is sent from the local system to the remote conference participants across the communication medium. The remote conference participants each generate a highlight bitmap from a location determined by the cursor position information received from the local system. In processing block 1044, the local user (and each remote conference participant if the cursor is located in the public workspace) logically ANDs together the highlight bitmap and the bitmap of the currently displayed foreground image. As a result of this operation, a highlighted foreground image is created and displayed on the display screen. If the cursor is located in the public workspace, each conference participant has a corresponding highlighted foreground image. As long as the mouse button is active, processing path 1048 is taken to the bubble labeled A where the highlight image is regenerated for a new cursor position. When the signal generation device or mouse button is deactivated, processing path 1050 is taken to decision block 1052. If the cursor is located in the public workspace, a tool deactivation message is sent by the local user to all other conference participants across the communication medium. This deactivation message informs other conference participants that the highlighting tool has been deactivated. If the cursor is not located in the public workspace, processing path 1054 is taken to avoid the step of sending highlighting tool deactivation information to other conference participants. Highlighting tool processing logic then terminates through return bubble 1060 illustrated in FIG. 11.

Thus, an improved method and apparatus for highlighting information between conference participants is disclosed. These specific arrangements and methods herein are merely illustrative of the principles of this invention. Numerous modifications in form and detail may be made by those of ordinary skill in the art without departing from the scope of the present invention. Although this invention has been shown in relation to a particular embodiment, it should not be considered so limited. Rather, the present invention is limited only by the scope of the appended claims.

I claim:

1. A computer readable medium that stores a computer program for highlighting information on a remote display in a computer conferencing system including a first participant coupled to a second participant via a communication medium, said first participant having a local display and a local input device for controlling a local cursor, said second participant having a remote display, said computer program comprising instructions for:

selecting a highlighting tool using said local input device, said highlighting tool being a computer implemented function represented by an icon;

displaying said icon representing said highlighting tool on said local display;

activating said highlighting tool using said local input device; and displaying a highlight image corresponding to said selected highlighting tool on both said local display and said remote display upon the activation of said highlighting tool, said highlight image being displayed on said remote display in a position corresponding to a position of said local cursor on said local display, said step of displaying a highlight image including the steps of generating a highlight bitmap, generating a foreground image bitmap, and logically ANDing together said highlight bitmap and said foreground image bitmap.

2. The computer readable medium of claim 1 further including the computer program instruction for:

displaying said icon representing said highlighting tool on said remote display upon the activation of said highlighting tool.

3. The computer readable medium of claim 1 wherein said local input device includes a cursor control device and wherein said icon is a cursor icon responsive to said cursor control device.

4. The computer readable medium of claim 1 wherein said local input device includes a signal generation device, said selecting being performed using said cursor control device and said signal generation device.

5. The computer readable medium of claim 1 wherein said local input device includes a signal generation device, said activating being performed using said cursor control device and said signal generation device.

6. The computer readable medium of claim 1 further including the computer program instructions for:

providing a public workspace on said local display;

providing a private workspace on said local display; and determining if said position of said local cursor is within said public workspace or said private workspace.

7. The computer readable medium of claim 6 further including the computer program instruction for:

displaying said icon representing said highlighting tool on said remote display if said highlighting tool is activated while said local cursor is located within said public workspace.

8. The computer readable medium of claim 6 wherein the displaying of a highlight image on said remote display is performed if said highlighting tool is activated while said local cursor is located within said public workspace.

9. The computer readable medium of claim 6 further comprising the computer program instructions for:

sending cursor position information from said first participant to said second participant via said communication medium while said local cursor is located within said public workspace; and receiving cursor position information from said first participant by said second participant.

10. In a computer conferencing system including a first participant coupled to a second participant via a communication medium, said first participant having a local display and a local input device for controlling a local cursor, said second participant having a remote display, an apparatus for highlighting information on said remote display, said apparatus comprising:

unit to select a highlighting tool using said local input device, said highlighting tool being a computer implemented function represented by an icon;

unit to display said icon representing said highlighting tool on said local display;

unit to activate said highlighting tool using said local input device; and unit to display a highlight image corresponding to said selected highlighting tool on both said local display and said remote display, said unit to display a highlight image including unit to generate a highlight bitmap, unit to generate a foreground image bitmap, and unit to logically AND together said highlight bitmap and said foreground image bitmap.

11. The apparatus claimed in claim 10 further including:

unit to display said icon representing said highlighting tool on said remote display upon activation of said highlighting tool.

12. The apparatus as claimed in claim 10 wherein said local input device includes a cursor control device and wherein said icon is a cursor icon responsive to said cursor control device.

13. The apparatus as claimed in claim 10 wherein said local input device includes a signal generation device, said unit to display being coupled to said cursor control device and said signal generation device.

14. The apparatus as claimed in claim 10 wherein said local input device includes a signal generation device, said unit to activate being coupled to said cursor control device and said signal generation device.

15. The apparatus as claimed in claim 10 further including:

unit to provide a public workspace on said local display;

unit to provide a private workspace on said local display; and unit to determine if said position of said local cursor is within said public workspace or said private workspace.

16. The apparatus as claimed in claim 15 further including:

unit to display said icon representing said highlighting tool on said remote display if said highlighting tool is activated while said local cursor is located within said public workspace.

17. The apparatus as claimed in claim 15 wherein said unit to display a highlight image is adapted to display said highlight image on said remote display if said highlighting tool is activated while said local cursor is located within said public workspace.

18. The apparatus as claimed in claim 15 further including:

unit to send cursor position information from said first participant to said second participant via said communication medium while said local cursor is located within said public workspace; and unit to receive cursor position information from said first participant by said second participant.

* * * * *